(12) United States Patent
Paziński et al.

(10) Patent No.: US 11,641,144 B2
(45) Date of Patent: May 2, 2023

(54) GAS TURBINE ENGINES INCLUDING EMBEDDED ELECTRICAL MACHINES AND ASSOCIATED COOLING SYSTEMS

(71) Applicants: General Electric Company, Schenectady, NY (US); General Electric Company Polska sp. z o.o., Warsaw (PL); General Electric Deutschland Holding GmbH, Frankfurt (DE)

(72) Inventors: Adam Tomasz Paziński, Warsaw (PL); Tomasz Jan Bulsiewicz, Warsaw (PL); Mohamed Osama, Garching (DE); Christopher Delametter, Mechanicville, NY (US)

(73) Assignees: General Electric Company, Schenectady, NY (US); General Electric Company Polska sp. z o.o., Warsaw (PL); General Electric Deutschland Holding GmbH, Frankfurt (DE)

( * ) Notice: Subject to any disclaimer, the term of this patent is extended or adjusted under 35 U.S.C. 154(b) by 96 days.

(21) Appl. No.: 17/170,216

(22) Filed: Feb. 8, 2021

(65) Prior Publication Data

US 2022/0255396 A1   Aug. 11, 2022

(51) Int. Cl.
*H02K 5/20* (2006.01)
*H02K 1/278* (2022.01)
(Continued)

(52) U.S. Cl.
CPC ............. *H02K 5/207* (2021.01); *F02C 6/00* (2013.01); *F02C 7/18* (2013.01); *H02K 1/278* (2013.01);
(Continued)

(58) Field of Classification Search
CPC .......... H02K 5/207; H02K 1/278; H02K 1/32; H02K 7/1823; H02K 21/14; F02C 6/00;
(Continued)

(56) References Cited

U.S. PATENT DOCUMENTS 3,610,976 A * 10/1971 Wightman ............... H02K 9/06
310/60 R
7,372,175 B2 5/2008 Bouiller et al.
(Continued)

FOREIGN PATENT DOCUMENTS

EP        3133266 A1   2/2017
WO   2018089066 A2   5/2018

*Primary Examiner* — Pedro J Cuevas
(74) *Attorney, Agent, or Firm* — Dinsmore & Shohl LLP

(57) ABSTRACT

A method of removing heat from an electrical machine located in a gas turbine engine at least partially inward of a core airflow path in a radial direction, the electrical machine including an outer generator stator and an inner generator rotor is provided. The method includes directing cooling airflow radially through an airflow passageway to an enclosure at least partially defined by a thermal shield at least partially around the electrical machine. The cooling airflow is directed radially inward past the outer generator stator and toward the inner generator rotor using a cooling manifold thereby removing heat from the generator rotor.

24 Claims, 9 Drawing Sheets

(51) Int. Cl.
  *H02K 7/18* (2006.01)
  *H02K 21/14* (2006.01)
  *H02K 1/32* (2006.01)
  *F02C 7/18* (2006.01)
  *F02C 6/00* (2006.01)

(52) U.S. Cl.
  CPC ............ *H02K 1/32* (2013.01); *H02K 7/1823* (2013.01); *H02K 21/14* (2013.01); *F05D 2220/323* (2013.01); *F05D 2220/76* (2013.01); *F05D 2260/201* (2013.01)

(58) Field of Classification Search
  CPC .. F02C 7/18; F05D 2220/323; F05D 2220/76; F05D 2260/201
  See application file for complete search history.

(56) References Cited

U.S. PATENT DOCUMENTS

| | | | |
|---|---|---|---|
| 7,805,925 B2 | 10/2010 | Durocher et al. | |
| 9,097,134 B2 | 8/2015 | Ferch et al. | |
| 9,698,638 B2* | 7/2017 | Li | H02K 1/32 |
| 10,038,352 B2* | 7/2018 | Airoldi | F03D 15/20 |
| 10,087,884 B2 | 10/2018 | Peters et al. | |
| 10,801,410 B2 | 10/2020 | Roberge | |
| 11,236,678 B2* | 2/2022 | Davies | F01D 25/16 |
| 2010/0176670 A1* | 7/2010 | Gottfried | H02K 9/10 |
| | | | 310/61 |
| 2015/0372566 A1* | 12/2015 | Airoldi | F03D 80/80 |
| | | | 290/55 |
| 2016/0233742 A1* | 8/2016 | Airoldi | H02K 9/04 |
| 2020/0180771 A1 | 6/2020 | Moore et al. | |
| 2020/0290744 A1 | 9/2020 | Spierling | |
| 2020/0291810 A1 | 9/2020 | Spierling | |
| 2021/0079850 A1* | 3/2021 | Davies | F02K 5/00 |
| 2022/0056810 A1* | 2/2022 | Grunwald | F01D 15/10 |
| 2022/0056846 A1* | 2/2022 | Pazinski | F01D 15/10 |
| 2022/0251965 A1* | 8/2022 | Czarnik | F01D 25/12 |
| 2022/0251971 A1* | 8/2022 | Pazinski | F01D 15/10 |
| 2022/0255396 A1* | 8/2022 | Pazinski | F02C 6/00 |
| 2022/0255401 A1* | 8/2022 | Czarnik | H02K 7/14 |

\* cited by examiner

GAS TURBINE ENGINES INCLUDING EMBEDDED ELECTRICAL MACHINES AND ASSOCIATED COOLING SYSTEMS

BACKGROUND

Field

The present specification generally relates to gas turbine engines and, more specifically, to gas turbine engines that include embedded electrical machines and associated cooling systems for cooling the electrical machines.

Technical Background

Gas turbine engines are frequently used as part of aircraft propulsion systems. Gas turbine engines may include a compressor section, a combustion section, a turbine section and an exhaust section. Air is provided by a fan to the compressor section where the air is compressed and delivered to the combustion section. In the combustion section, the air is mixed with fuel and then burned. The combustion gases are then delivered to the turbine section, which drives the turbine section before delivering the combustion gases to the exhaust section.

During operation, temperatures within the gas turbine engines may be elevated. In order to manage the increases in temperature of the gas turbine engines, various cooling systems may be provided that are used to remove thermal energy from various components of the gas turbine engines. Certain components of the gas turbine engines may be more adept at handling increases in temperatures than other components. It may be desirable, for example, to limit temperature increases of electrical machines that may be embedded within the gas turbine engines.

SUMMARY

According to an embodiment of the present disclosure, a method of removing heat from an electrical machine located in a gas turbine engine at least partially inward of a core airflow path in a radial direction, the electrical machine including an outer generator stator and an inner generator rotor is provided. The method includes directing cooling airflow radially through an airflow passageway to an enclosure at least partially defined by a thermal shield at least partially around the electrical machine. The cooling airflow is directed radially inward past the outer generator stator and toward the inner generator rotor using a cooling manifold thereby removing heat from the generator rotor.

According to another embodiment of the present disclosure, a gas turbine engine includes a compressor section and a turbine section arranged in serial flow order. The compressor section and the turbine section together define a core airflow path. A rotary member is rotatable with at least a portion of the compressor section and with at least a portion of the turbine section. An electrical machine is located at least partially inward of the core airflow path in a radial direction. The electrical machine includes an outer generator stator and an inner generator rotor that is coupled to the rotary member. A thermal shield forms an enclosure at least partially around the electrical machine. The thermal shield at least partially defines a cooling airflow path at least partially around the electrical machine. A cooling manifold directs a cooling airflow received from an airflow passageway past the outer generator stator and onto the inner generator rotor.

Additional features, embodiments and advantages of the gas turbine engines and methods of their use described herein will be set forth in the detailed description which follows, and in part will be readily apparent to those skilled in the art that such features, embodiments and advantages are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter described and claimed herein. The accompanying drawings are included to provide a further understanding of the various embodiments, and are incorporated into and constitute a part of this specification. The drawings illustrate the various embodiments described herein, and together with the description serve to explain the principles and operations of the subject matter described and claimed herein.

DETAILED DESCRIPTION

Embodiments described herein are generally directed to gas turbine engines that include embedded electrical machines and associated cooling systems for cooling the electrical machines. The gas turbine engines may include a compressor section and a turbine section arranged in serial flow order and together defining a core airflow path. A rotary member, such as a shaft, spool, etc., is rotatable with at least portions of the compressor section and turbine section. The electrical machine is embedded within the gas turbine engines. The electrical machine may be rotatable with the rotary member and positioned coaxially with the rotary member at least partially inward of the core airflow path along a radial direction of the gas turbine engines. The electrical machine may be an electric generator that is driven by the rotary member.

The gas turbine engines include a cooling system that cools the electrical machine, which may be needed due to the rearward location of the electrical machine in the gas turbine engines. In particular, the electrical machine may be located at least partially inward of the core airflow path in the radial direction and rearward within a tail cone. An enclosure may be provided that at least partially encloses the electrical machine. The enclosure may at least partially define at least one airflow path about the electrical machine. The at least one airflow path about the electrical machine may receive air from an airflow passageway that is provided through a strut of a turbine rear frame. A thermal insulation blanket may be provided around and along the airflow passageway to reduce heat transfer from outside exhaust air exiting the turbine section to cooling air flowing through the airflow passageway.

In some embodiments, the gas turbine engines include the cooling system that directs cooling air onto an inner generator rotor of the electrical machine. For example, a cooling plate may be mounted inward of the inner generator rotor, between the rotary member and the inner generator rotor, the inner generator rotor being connected to the rotary member so that the inner generator rotor rotates with the rotary member to generate electrical power. In some embodiments, the cooling plate may be part of the rotor structure and direct air directly onto rotor components. In some embodiments, the cooling plate may also be connected to the rotary member so that the cooling plate rotates with the inner generator rotor. The cooling plate is shaped and arranged to guide the cooling air received from the airflow passageway to the rotor for cooling.

Figure 1:
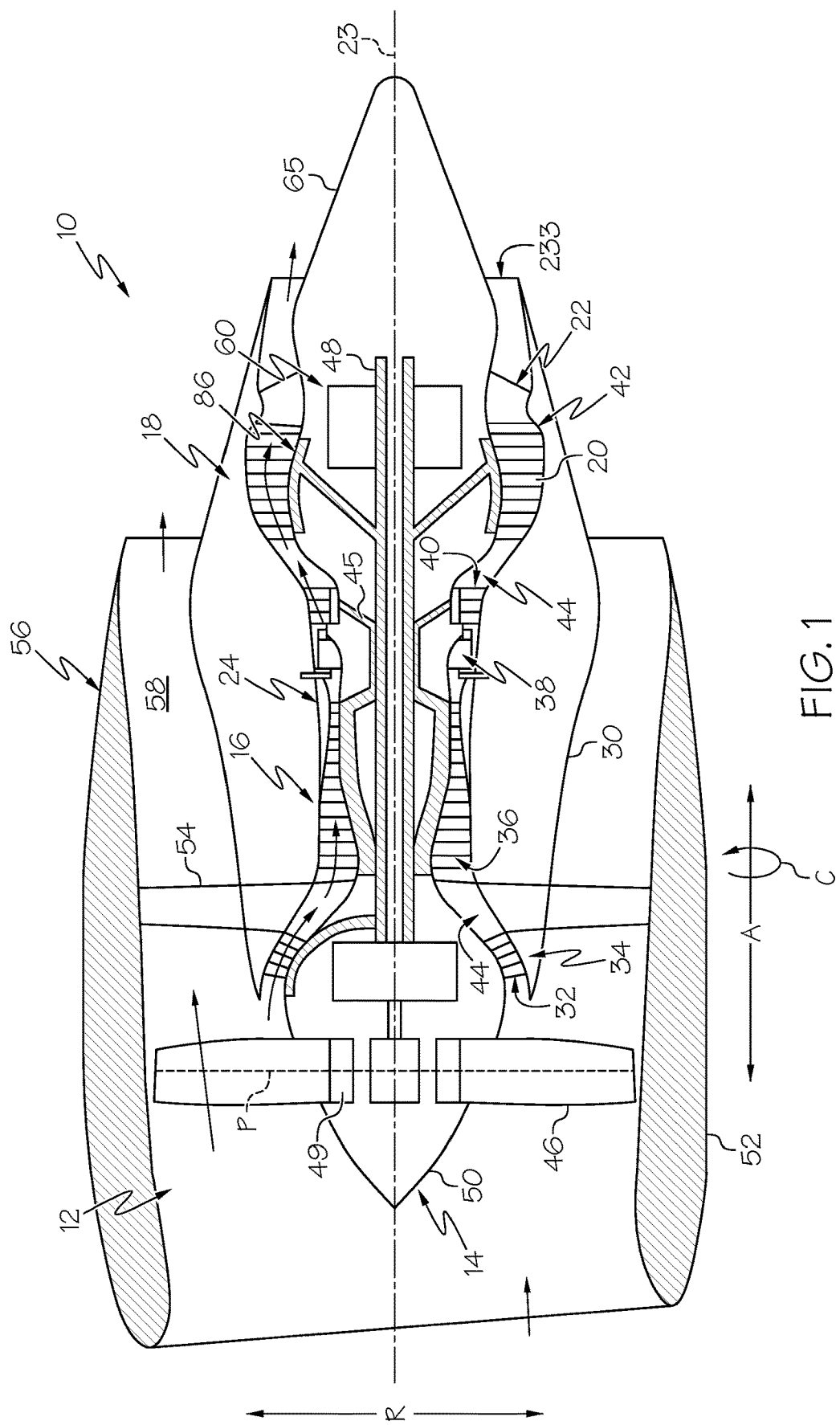
FIG. 1 is a diagrammatic section view of a gas turbine engine including an electrical machine, according to one or more embodiments shown and described herein.

Referring to FIG. 1, an exemplary gas turbine engine 10 may be configured for wing or fuselage mounting on an aircraft. In some embodiments, the gas turbine engine 10 may also be used to provide power. The gas turbine engine 10 includes a fan section 12 including a fan 14, a compressor section 16 and a turbine section 18. The fan section 12, compressor section 16 and turbine section 18 may include one or more rotor disks 20 that include rotor blades extending radially therefrom. Air is drawn into the gas turbine engine 10 and accelerated by the fan 14. The air, or at least a portion thereof, is compressed in the compressor section 16 and is delivered to a combustion chamber where the air is mixed with fuel and combusted thereby generating hot combustion gas. The combustion gases pass through a turbine section 18, which extracts mechanical work from the combustion gases to cause the attached compressor section 16 to turn and thereby further compress the upstream air to produce a self-sustaining process. The combustion gas is exhausted through a nozzle section 22.

The gas turbine engine 10 defines an axial direction A that extends parallel to a longitudinal centerline 23, a radial direction R that extends perpendicular to the axial direction A, and a circumferential direction C that extends about the axial direction A. As used herein, the terms "inner" and "outer" are used with reference to centerline 23 such that inner is closer to the centerline 23 and outer is farther from the centerline 23. The gas turbine engine 10 includes the fan section 12 and a core section 24 that is located downstream of the fan section 12 in the axial direction.

The gas turbine engine 10 includes a tubular core cowl 30 that defines, at least in part, an annular inlet 32. The core cowl 30 encases, in serial flow relationship, the compressor section 16 including a booster or low pressure (LP) compressor 34 and a high pressure (HP) compressor 36; a combustion section 38 that includes the combustion chamber; the turbine section 18 including a high pressure (HP) turbine 40 and a low pressure (LP) turbine 42; and the jet exhaust nozzle section 22. The compressor section 16, combustion section 38, and turbine section 18 together define a core airflow path 44 extending from the annular inlet 32 through the LP compressor 34, HP compressor 36, combustion section 38, and HP turbine 40. A first shaft or spool 45 drivingly connects the HP turbine 40 to the HP compressor 36. A second shaft or spool 48 drivingly connects the LP turbine 42 to the LP compressor 34 and the fan 14.

The fan section 12 includes the fan 14 having a plurality of fan blades 46 coupled to a disk 49 in a spaced apart manner. The fan blades 46 extend outwardly from disk 49 generally along the radial direction R. The disk 49 is covered by rotatable front hub 50 that is aerodynamically contoured to promote an air flow through the plurality of fan blades 46. The exemplary fan section 12 includes an annular fan casing or outer nacelle 52 that circumferentially surrounds the fan 14 and/or at least a portion of the core section 24. The outer nacelle 52 is supported relative to the core section 24 by a plurality of circumferentially-spaced struts that also serve as outlet guide vanes 54. A downstream section 56 of the outer nacelle 52 extends over an outer portion of the core cowl 30 to define a bypass airflow passage 58 therebetween.

The gas turbine engine 10 includes an electrical machine 60 that is rotatable with the fan 14 and is located within a tail cone 65. The electrical machine 60 may be an electric generator co-axially mounted to and rotatable with the second shaft 48. The electrical machine 60 may be used as a motor that converts electrical energy into mechanical energy. In some embodiments, an axis of the electrical machine 60 may be offset radially from the axis of the second shaft 48 and further may be oblique to the axis of the second shaft 48, such that the electrical machine 60 may be positioned at any suitable location at least partially inward of the core airflow path 44. In some embodiments, the electrical machine 60 may be rotatable with the first shaft 45.

The gas turbine engine 10 depicted in FIG. 1 is provided by way of example only. In other exemplary embodiments the gas turbine engine 10 may be replaced with other types of gas turbine engines utilizing an embedded electrical machine without loss of clarity. Examples include a turboprop engine, a turbojet engine, an open rotor, or unducted fan engine.

Figure 2:
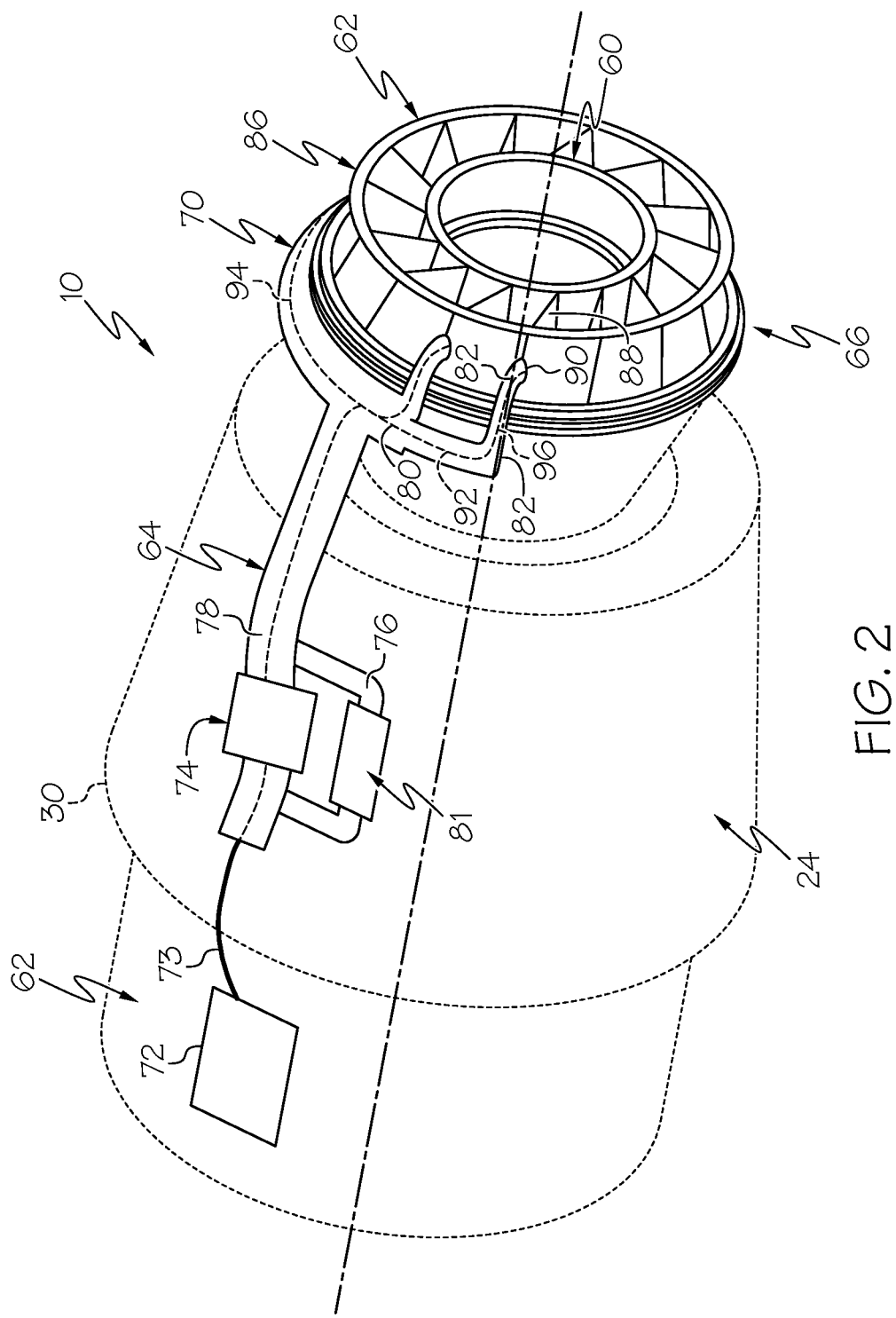
FIG. 2 is a diagrammatic perspective view of a portion of the gas turbine engine of FIG. 1 including a location for the electrical machine and both an electrical system and a cooling system for cooling the electrical system and electrical machine, according to one or more embodiments shown and described herein.

Referring to FIG. 2, a perspective view of a portion of the gas turbine engine 10 is illustrated diagrammatically and generally describes an electrical system 62 and a cooling system 64. The electrical system 62 includes the electrical machine 60 disposed in an aft portion 66 of the gas turbine engine 10 (FIG. 1). The aft portion 66 is disposed axially downstream the core section 24 of the gas turbine engine 10. The electrical machine 60 converts mechanical energy (e.g., generated from exhaust gases generated in the core section 24) produced by the gas turbine engine 10 into electrical energy that may be used to power electrical devices of the gas turbine engine 10 or components disposed elsewhere on an aircraft incorporating the gas turbine engine 10. Positioning the electrical machine 60 in the aft portion 66 of the gas turbine engine 10 can render the electrical machine 60 accessible for maintenance, repair, and replacement. The electrical machine 60 may be integrated into the gas turbine engine 10 via a set of connections that may be removed without invasively disassembling the entirety of the gas turbine engine 10, such as without removing the gas turbine engine 10 from a wing of an aircraft.

Positioning the electrical machine 60 in the aft portion 66 provides accessibility, but can create additional design considerations for the gas turbine engine 10. Exhaust gases generated via the core section 24 can be at relatively high temperatures (e.g., in excess of approximately 700° C. or more in various embodiments), which renders cooling the electrical machine 60 beneficial. Additionally, the aft portion 66 of the gas turbine engine 10 may not be directly connected to an aircraft incorporating the gas turbine engine 10 (e.g., the gas turbine engine 10 may be connected to a wing of an aircraft via a pylon extending from the outer nacelle 52 (FIG. 1) disposed radially outward from the core section 24). Given this, to provide the electrical power generated via the electrical machine 60 to other portions of the aircraft, the electrical power is routed through the gas turbine engine 10.

In view of the foregoing, the electrical system 62 includes a connection assembly 70 that is routed through the cooling system 64. The connection assembly 70 includes a plurality of electrical connectors 73 (e.g., power cables) that conductively connect the electrical machine 60 to a converter 72. For example, the electrical machine 60 may generate an alternating current ("AC") power signal from mechanical energy in the spinning LP shaft 48, which electrical power is routed to the converter 72 (located in the forward part of the engine) via the connection assembly 70. The converter 72 may generate a DC voltage from the AC power signal for communication to alternative locations on the aircraft (e.g., via an electrical communications bus). The structure of the converter 72 and connection assembly 70 may vary depending, at least in part, on the structure and capabilities of the electrical machine 60. For example, in various embodiments, the electrical machine 60 may generate an AC power signal having any number of phases (e.g., one phase, two phases, three phases, four phases, etc.).

The cooling system 64 routes cooling air from an air source to the electrical machine 60 to maintain the electrical machine 60 in a desired temperature range despite the electrical machine 60 being disposed proximate to relatively high temperature exhaust generated via the core section 24.

Figure 5A:
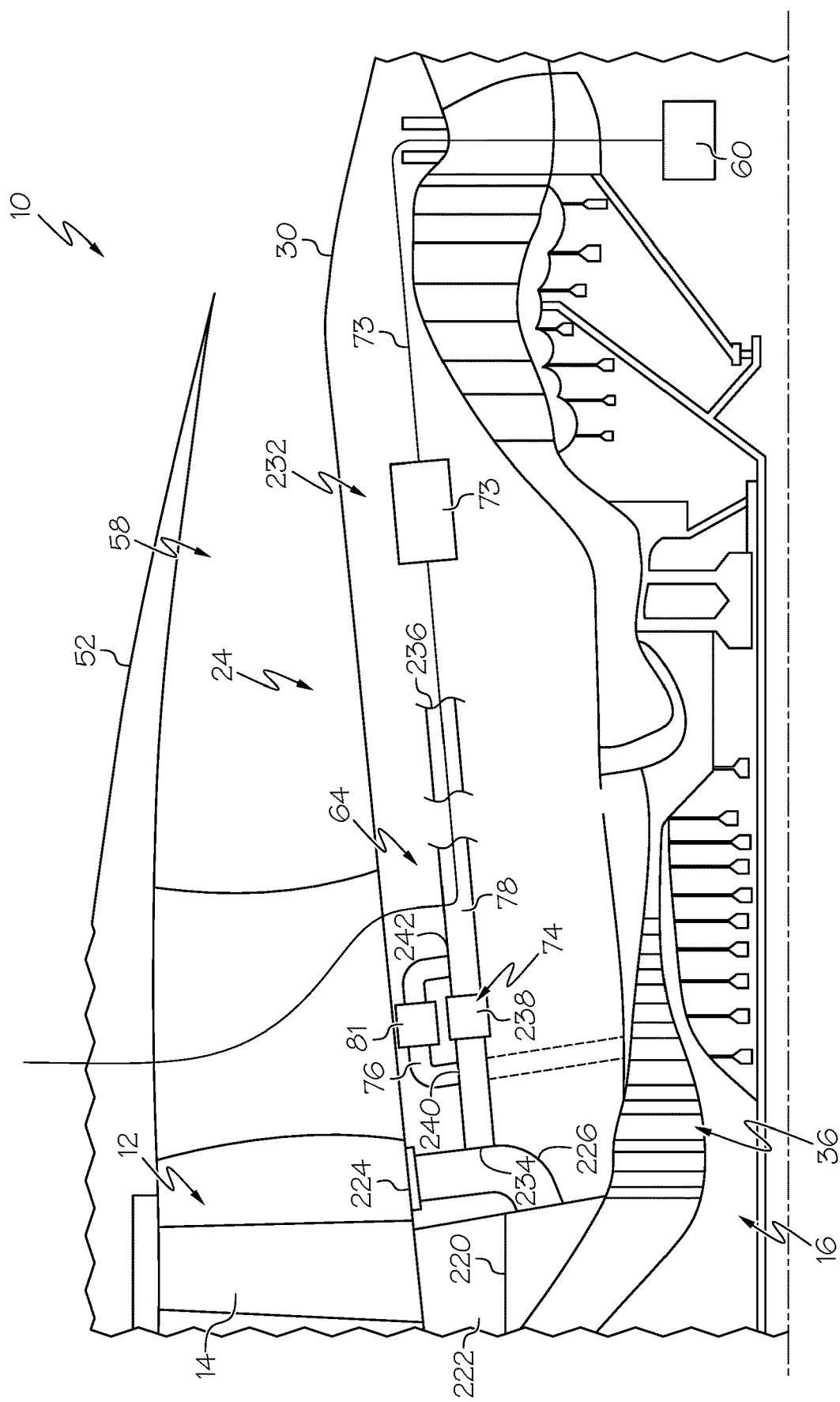
FIG. 5A is a diagrammatic section view of the gas turbine engine of FIG. 1 including a cooling system, according to one or more embodiments shown and described herein.

The cooling system 64 may include a valve assembly 74 in fluid communication with the air source (see also FIG. 5A). In embodiments, the valve assembly 74 may be controlled by a controller (e.g., FADEC controlled) or it may be initiated for a pre-set period of time during or after engine shutdown. The blower may alternatively be operated for a period of time, based on a temperature sensor in proximity to the electrical machine or elsewhere within the core cowl. Upon initiating the blower (during or after shutdown) the valve assembly 74 is opened and cooling air drawn into the cooling system 64. The cooling system 64 may further include a bypass duct 76 that can be used to bypass the valve assembly 74. A cooling blower assembly 81 may be controlled via the controller to operate during time periods when the valve assembly 74 is closed. Cooling air may be provided to the electrical machine 60 using the bypass duct 76 and the cooling blower assembly 81 irrespective of a state of operation of the gas turbine engine 10. The cooling blower assembly 81 may be powered by an aircraft or another power source dedicated for use by the cooling blower assembly 81.

The cooling system 64 may include a plurality of different ducts having structures extending in different directions at various positions within the gas turbine engine 10. As depicted, the cooling system 64 includes a main duct 78, a circumferential duct 80, and a plurality of generator cooling ducts 82 that may or may not continue through struts 88 (i.e., the struts 88 may have their own airflow passageways; see FIGS. 6A-6D). The main duct 78, the circumferential duct 80, and the plurality of generator cooling ducts 82 may be designed to provide adequate space for routing the connection assembly 70 to the electrical machine 60 while reducing impacts on aerodynamic performance of the gas turbine engine 10.

The valve assembly 74 controls airflow through the main duct 78. The main duct 78 directs the cooling air towards the aft portion 66 where the electrical machine 60 is located. The circumferential duct 80 divides the cooling air into circumferential portions and directs the cooling air in a circumferential direction around a turbine rear frame 86. In embodiments, the plurality of generator cooling ducts 82 divide each circumferential portion of the cooling air into cooling portions that are provided to the electrical machine 60 via struts 88 of the turbine rear frame 86. In some embodiments, the cooling system 64 includes four generator cooling ducts 82 that provide cooling air to the electrical machine 60 via four separate struts 88 of the turbine rear frame 86. It should be noted that any suitable existing structures of the gas turbine engine 10 may be made into cooling ducts configured to direct cooling air to a desired location. In embodiments, the generator cooling ducts 82 extend through the struts 88 into a generator coupler in fluid communication with the electrical machine 60 to cool the electrical machine 60. Each of the generator cooling ducts 82 may attach to one of outer ends 90 of the struts 88 to provide cooling air into an internal cavity defined by the strut 88 to which that generator duct 82 is attached. The struts 88 may be airfoil shaped and provide rigid structures between the core cowl 30 and internal components of the engine core, as well as turn the airflow exiting the engine core from an angular or swirling direction to an axial direction when exhausting the airflow.

The electrical connectors 73 of the connection assembly 70 extend through the main duct 78, the circumferential duct 80, the plurality of generator cooling ducts 82 and the struts 88 of the turbine rear frame 86 to conductively connect the converter 72 to the electrical machine 60. In embodiments, various sets of electrical connectors of the electrical connection assembly 70 extend through different combinations of ducts of the cooling system 64 to connect different portions (e.g., terminations) of the electrical machine 60 to the converter 72. For example, a first subset of electrical connectors 92 may be directed through a first portion of the circumferential duct 80 and a second subset of electrical connectors 94 may be directed through a second portion of the circumferential duct 80. The first and second subsets of electrical connectors 92 and 94 may be further divided such that baseline sets of electrical connectors 96 are routed through each generator duct 82, through one of the struts 88, and into the generator coupler for electrical connection to the electrical machine 60.

Figure 3:
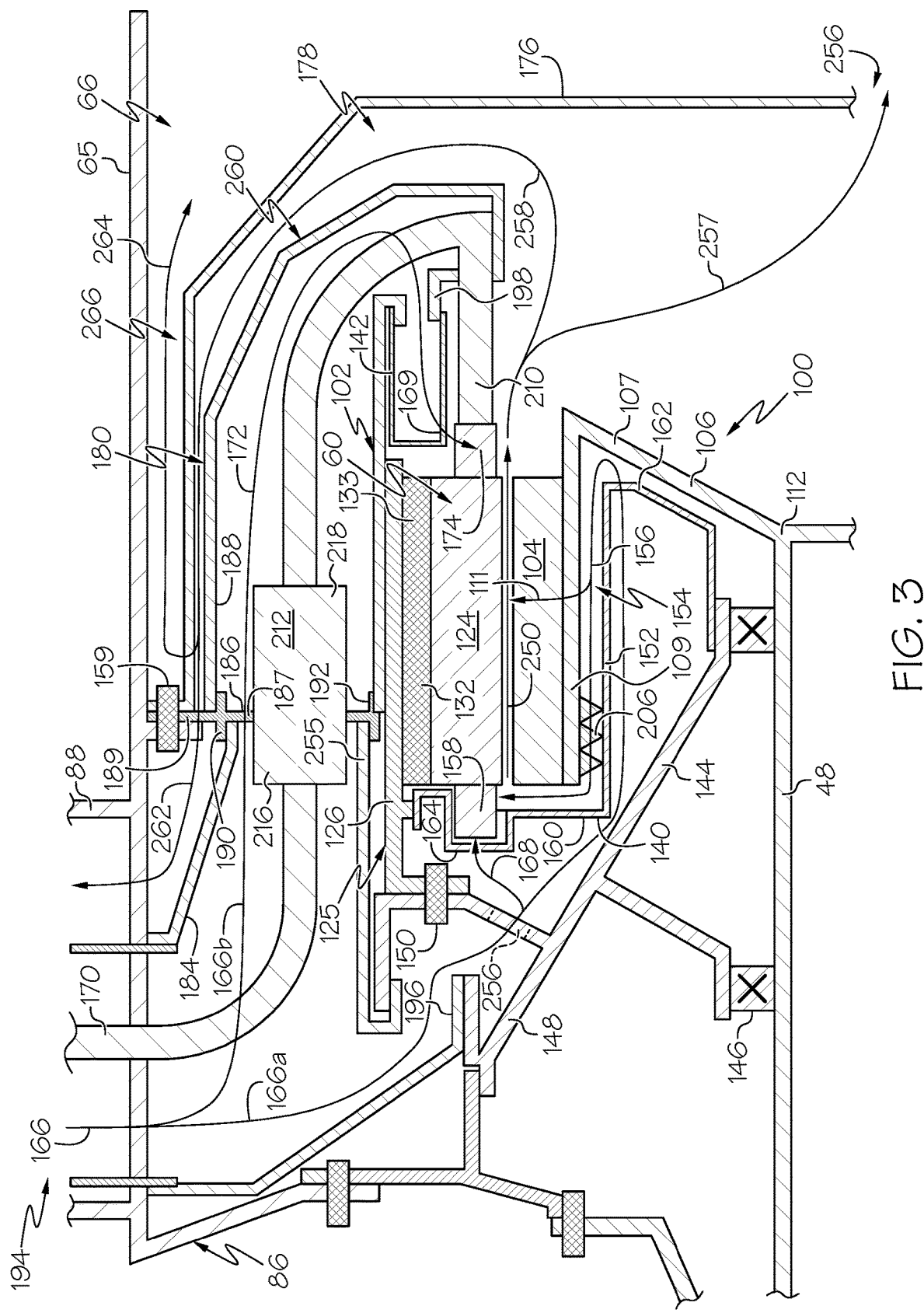
FIG. 3 is a diagrammatic section view of an aft portion of the gas turbine engine of FIG. 1 including the electrical machine, according to one or more embodiments shown and described herein.

Referring to FIG. 3, the electrical machine 60 embedded within the turbine section 18 of the gas turbine engine 10, and in particular the tail cone 65, is shown. The electrical machine 60 is attached to the second shaft 48 by a generator rotor subassembly 100. The electrical machine 60 includes the generator rotor subassembly 100 and a generator stator subassembly 102. The generator rotor subassembly 100 includes a rotor support member 106 that is connected to the second shaft 48 at a connection 112. Release of the connection 112 can facilitate removal of the generator rotor subassembly 100 from the aft portion 66 of the gas turbine engine 10. The rotor support member 106 includes a radial portion 107 and an axial portion 109. In some embodiments, the axial portion 109 may be formed to allow cooling airflow to flow directly into the inner generator rotor 104, shown by arrow 111, as will be described in further detail below.

The generator stator subassembly 102 includes an outer generator stator 124 that is fixedly connected to a stationary support assembly 125 that includes a stator support member 126. The stationary support assembly 125 further includes a cooling jacket 132 between the stator support member 126 and the outer generator stator 124 that includes a plurality of coolant cavities, represented by element 133, that can receive a coolant liquid, such as an oil, from a liquid coolant source used to control temperature of the outer generator stator 124 during operation.

Both the generator rotor subassembly 100 and the generator stator subassembly 102 include cooling manifolds 140 and 142 that at least partially surround their respective inner generator rotor 104 and outer generator stator 124. The inner cooling manifold 140 is mounted to a stationary support structure 144 that is, in turn, mounted to the shaft 48 using bearings 146 and also to the turbine rear frame 86 at an opposite end 148. The support structure 144 is also illustrated as being mounted to the stator support member 126 at connection 150. Release of the connection 150 can facilitate removal of the generator stator subassembly 102 from the aft portion 66 of the gas turbine engine 10.

The inner cooling manifold 140 extends radially from the support structure 144 to an inner cooling plate 152. The inner cooling plate 152 extends axially and radially under the inner generator rotor 104. A space is provided between the inner generator rotor 104 and the inner cooling plate 152 to provide an airflow passageway 154 therebetween so that cooling airflow 156 may be directed to the inner generator rotor 104. In some embodiments, the inner cooling plate 152 may be mounted to the shaft 48 and/or the inner generator rotor 104 (e.g., using the rotor support member 106) for rotation therewith.

Figure 4A:
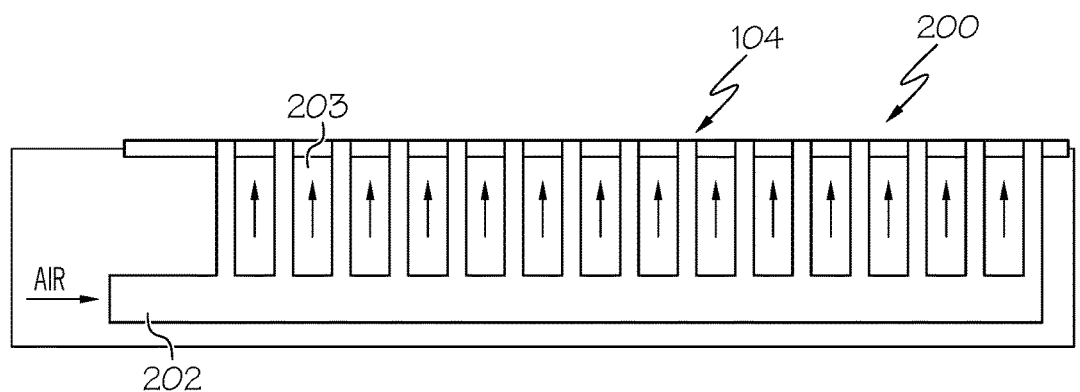
FIG. 4A is a diagrammatic section view of a portion of a generator rotor of the electrical machine of FIG. 3 with cooling channels, according to one or more embodiments shown and described herein.
Figure 4B:
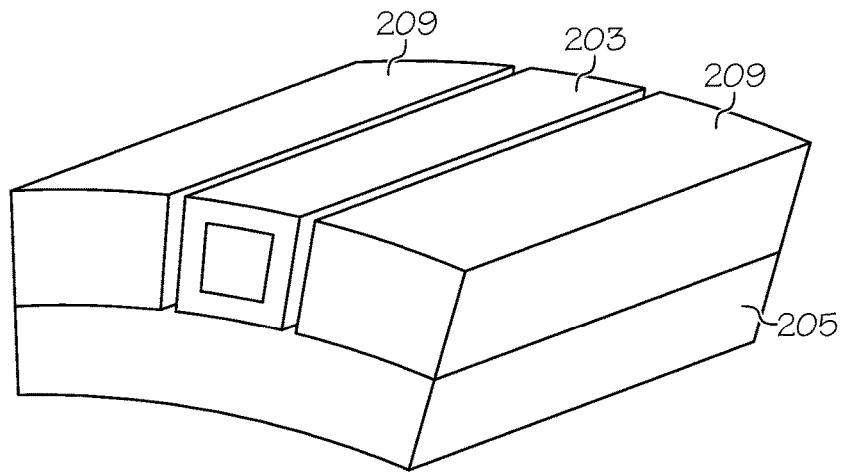
FIG. 4B is a diagrammatic section view of a portion of the generator rotor with cooling channels of FIG. 4A, according to one or more embodiments shown and described herein.
Figure 4C:
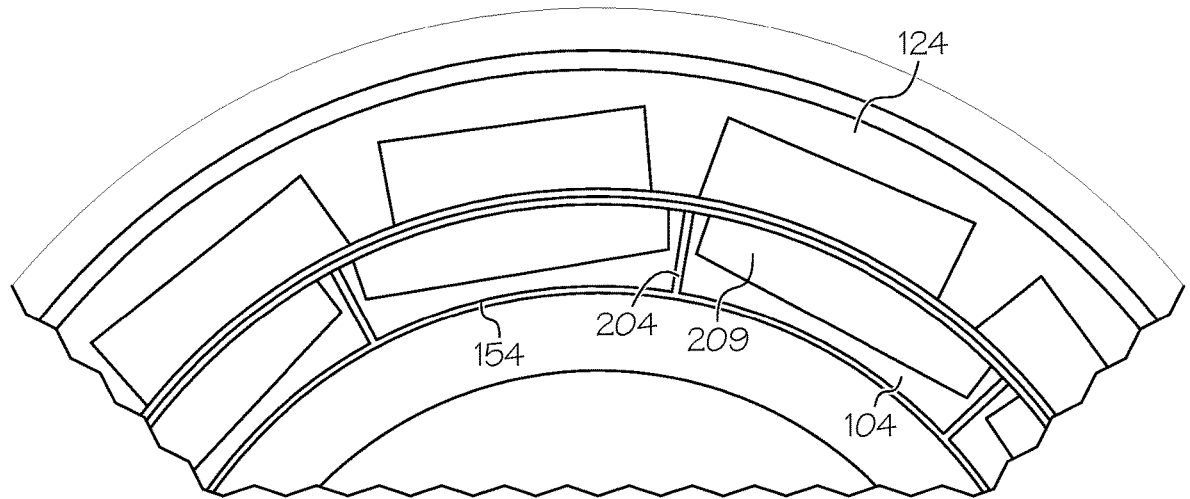
FIG. 4C is a diagrammatic section view of a portion of an electrical machine for use in the gas turbine engine of FIG. 1, according to one or more embodiments shown and described herein.

Referring briefly to FIG. 4A as examples, an embodiment of the inner generator rotor 104 is illustrated that includes a duct 202 (e.g., that may form the airflow passageway 154) that provides cooling airflow to individual cooling ducts 203. The cooling ducts 203 may be axially and/or radially oriented and can send airflow directly to the components of the inner generator rotor 104, such as surface mounted permanent magnets, such as shown in FIG. 4B. In the example of FIG. 4B, the cooling duct 203 may be connected to or formed as part of rotor disk 205. The rotor disk 205 may include surface mounted permanent magnets (SPMs) 209 on opposite sides of the cooling duct 203. FIG. 4C, as another example, illustrates radial chimneys 204 directing airflow from passageway 154 through the generator rotor between the magnets 209 and to the gap between the generator rotor 102 and outer generator stator 124 where the cooling airflow can travel away from the electrical machine. As shown in FIG. 3, a seal 206 (e.g., a labyrinth seal) may be used to adjust the airflow rate through the radially extending chimneys 204 and/or cooling ducts 203. In other embodiments, a seal 206 may not be used and airflow rate may be controlled by the number and size of openings through the cooling manifold 140.

Referring again to FIG. 3, a radial portion 160 of the inner cooling manifold 140 extends radially outward from the inner cooling plate 152 and about the end windings 158, connecting to the stationary support assembly 125. As will be described in greater detail below, the inner cooling manifold 140 includes airflow openings (represented by elements 162 and 164) that split incoming cooling airflow 166 into multiple cooling airflows 156 and 168 that impinge upon the end windings 158. The seal 206 can also be used to control airflow rates between the cooling airflows 156 and 168. In other embodiments, there may be no seal 206 and the airflow split can be controlled using the number and diameters of openings 162 and 164. For example, the airflow rates of the cooling airflows 156 and 168 may be different or they may be about the same.

The outer cooling manifold 142 is also mounted to the stationary support assembly 125. In some embodiments, the outer cooling manifold 142 and the inner cooling manifold 140 may be part of the same manifold structure and be connected together at a cross-section different than the one illustrated by FIG. 3. In some embodiments, the outer cooling manifold 142 and the inner cooling manifold 140 may be separate structures that are indirectly connected together, e.g., through the stationary support assembly 125. The outer cooling manifold 142 includes airflow openings (represented by element 169) that allow cooling airflow 172 to impinge upon the end windings 174.

A thermal shield 176 defines an enclosure 178 that extends from a coupler 159 coupled to the turbine rear frame 86 both axially and radially about the electrical machine 60. The thermal shield 176 may be formed of any suitable material, such as ceramic, aluminum, steel, etc. As used herein, a "thermal shield" refers to a structure that is effective in reducing one or more of convective, conductive and radiative heat transfer to the electrical machine 60.

A duct assembly 180 is connected to the coupler 159. The duct assembly 180 includes a first duct structure 184 that is connected to the coupler 159 via a duct support bracket 186 and a second duct structure 188 that is also connected to the coupler 159 via the duct support bracket 186 such that the first and second duct structures 184 and 188 are in fluid communication. Seals, represented by elements 190 and 192, may be provided to provide an air-tight seal between the duct structures 184 and 188. The duct support bracket 186 may include openings, represented by elements 187 and 189, that allow airflow between the first and second duct structures 184 and 188.

The first duct structure 184 is fluidly connected to an air passageway 194 that extends through the strut 88. The first duct structure 184 leads to one or more outlets 196 that provide the cooling airflow 166 to the inner cooling manifold 140. The second duct structure 188 is fluidly connected to the first duct structure 184. The second duct structure 188 includes one or more outlets 198 that provide the cooling airflow 172 to the outer cooling manifold 142.

The inner generator rotor 104 and the outer generator stator 124 operate together to generate power as the second shaft 48 rotates during engine operation. In some embodiments, the inner generator rotor 104 includes a plurality of permanent magnets circumferentially distributed about the outer generator stator 124 such that rotation of the inner generator rotor 104 about the outer generator stator 124 generates an AC power signal. The outer generator stator 124 may include a plurality of windings conductively connected via a conductor 210 to an electrical connector 212. The electrical connector 212 may be supported by the duct support bracket 186 that is connected to the coupler 159.

The electrical connector 212 is an electrical coupler that is configured to provide a conductive connection between the electrical connector 212 electrically coupled to the outer generator stator 124 and electrical lines 170. The electrical lines 170 may be, for example, routed through one of the struts 88 of the turbine rear frame 86. The electrical connector 212 may have a first portion 216 that is located in the first duct structure 184 and a second portion 218 that is located in the second duct structure 188. As will be described further below, the duct assembly 180 can be used to route cooling air into and through the enclosure 178 for removing heat from the electrical machine 60.

Referring to FIG. 5A, as discussed above, the gas turbine engine 10 includes the cooling system 64 that is used to remove heat from the electrical machine 60. The cooling system 64 includes the valve assembly 74 that controls the flow of cooling air from the air source, such as from the compressor section 16 and/or the fan section 12. In particular, FIG. 5A illustrates an embodiment of the core section 24 of the gas turbine engine 10 with the fan section 12 adjacent the core section 24. The HP compressor 36 includes a number of stages of rotating blades and stationary vanes all surrounded by compressor casing.

The gas turbine engine 10 may optionally incorporate a variable bleed valve ("VBV") system for controlling booster stall margin. The VBV system includes one or more variable bleed valves 220 mounted within a fan hub frame 222. The variable bleed valves 220 are open during low power operation of the gas turbine engine 10, such as at idle, for bleeding a portion of the compressed air. The variable bleed valves 220 may be closed at high power operation of the gas turbine engine 10, such as during cruise or takeoff, since bleeding may not be needed. When the variable bleed valves 220 are open, air is passed from a booster flow path through the fan hub frame 222 and into a bypass duct or more generally the bypass space external of the cowl 30. In the illustrated example, the engine 10 includes at least one bypass duct 226 defining an airflow path from the fan hub frame 222 to a bleed vent 224 communicating with the bypass airflow passage 58. In some embodiments, the main duct 78 may be communicatively connected to the bypass duct 226 for receiving cooling air therefrom. In some embodiments, the main duct 78 may be connected to an upstream location of the compressor section 16 for receiving cooling air therefrom.

The cooling system 64 includes the main duct 78 that may be communicatively connected to the bypass duct 226. The bypass duct 226 is provided to extract air away from the fan toward the bypass airflow passage 58. The extracted air may be used as the cooling air since the temperature of the cooling air is less than operating temperatures in the aft portion 66 without the cooling air. In particular, the cooling air can be used to cool the electrical machine 60 that is in the tail cone 65 (FIG. 3).

The engine core section 24 is surrounded by (contained within) the core cowl 30 which defines an inboard boundary of the bypass airflow passage 58 over which fan bypass air flows. Shown is a ducted turbofan, which includes the fan 14 or one of multiple fans surrounded by the outer nacelle 52 which is spaced-away from the core cowl 30 and defines an outboard boundary of the bypass airflow passage 58. In this example the bypass airflow passage 58 could also be referred to as a "fan duct." Alternatively, in the case of an open rotor engine, outer nacelle 52 would not be present and the bypass airflow passage 58 would be bounded only by an outer surface of the core cowl 30. The space inboard of the core cowl 30 is referred to as "undercowl space" 232. In practice, the undercowl space 232 may be vented to ambient external environment, for example through the vent 233 (shown schematically in FIG. 1). Things that are said to be internal to the engine, for purposes of this disclosure, means things that are located within the space surrounded by the outer nacelle 52, or the core cowl 30 (in a case such as an open rotor engine where the outer nacelle 52 is not present).

The main duct 78 may be located wholly or at least partially within the undercowl space 232. The main duct 78 has one or more inlets, represented by element 234, in fluid communication with the bypass duct 226. In some embodiments, the inlet 234 of the main duct 78 is connected directly to the bypass airflow passage 58 with or without being connected to the bypass duct 226. The main duct 78 further has an outlet, represented by element 236, that is in fluid communication with the circumferential duct 80 that is in fluid communication with the plurality of the generator cooling ducts 82 (FIG. 2).

The valve assembly 74 may be incorporated within the main duct 78 and includes one or more valves operable to control airflow through the main duct 78. As one example, the valve assembly 74 may include a valve 238 that may be a controllable valve that includes a flow control element movable between open and closed configurations. In the open configuration, airflow through the main duct 78 is permitted by the flow control element and, in the closed configuration, airflow through the main duct 78 is inhibited by the flow control element. In some embodiments, the valve 238 may have a variable intermediate configuration that allows for adjustment of the air flow to a selected airflow rate between predetermined minimum and maximum flowrates. As an example, the valve 238 may allow passage of up to about 100 percent of a total flow rate of cooling air from the bypass duct 226 through the main duct 78 during normal engine operation, such as up to about 70 percent, such as up to about 50 percent, such as up to about 25 percent, such as up to about 10 percent, such as between about 10 percent and about 90 percent, such as between about 30 percent and about 70 percent.

The bypass duct 76 may have an inlet 240 that is fluidly connected to the main duct 78 at a location that is upstream of the valve assembly 74. The bypass duct 76 may have an outlet 242 that is fluidly connected to the main duct 78 at a location that is downstream of the valve assembly 74. The inlet 240 and the outlet 242 of the bypass duct 76 may be on opposite sides of the valve assembly 74 such that cooling airflow can bypass the valve assembly 74 when the valve 238 is in the closed configuration.

The bypass duct 76 includes the cooling blower assembly 81 between inlet 240 and the outlet 242. The cooling blower assembly 81 may be any apparatus operable to blow, pump, or move a cooling airflow from the inlet 240 towards the outlet 242. A power source for operating the cooling blower assembly 81 may be mechanical, hydraulic, pneumatic, or electrical. For example, a blower rotor may be coupled to an electric motor. In one example, the motor may be an AC induction motor or DC motor. The motor may utilize a power source provided by an airplane, or may utilize its own power source, for example, internal to the cooling blower assembly. Further, the cooling blower assembly 81 may be sized to provide an adequate discharge pressure and flow rate for cooling of the electrical machine 60, which can depend, at least in part, on the size of the gas turbine engine. Also, the speed of the cooling blower assembly 81 may be controlled in order to change the air velocity automatically and/or in response to a user input. For example, the volumetric air flow rate provided by the cooling blower assembly 81 may be anywhere between about one $m^3$/min (50 cfm) to about 28.3 $m^3$/min (1000 cfm).

Figure 5B:
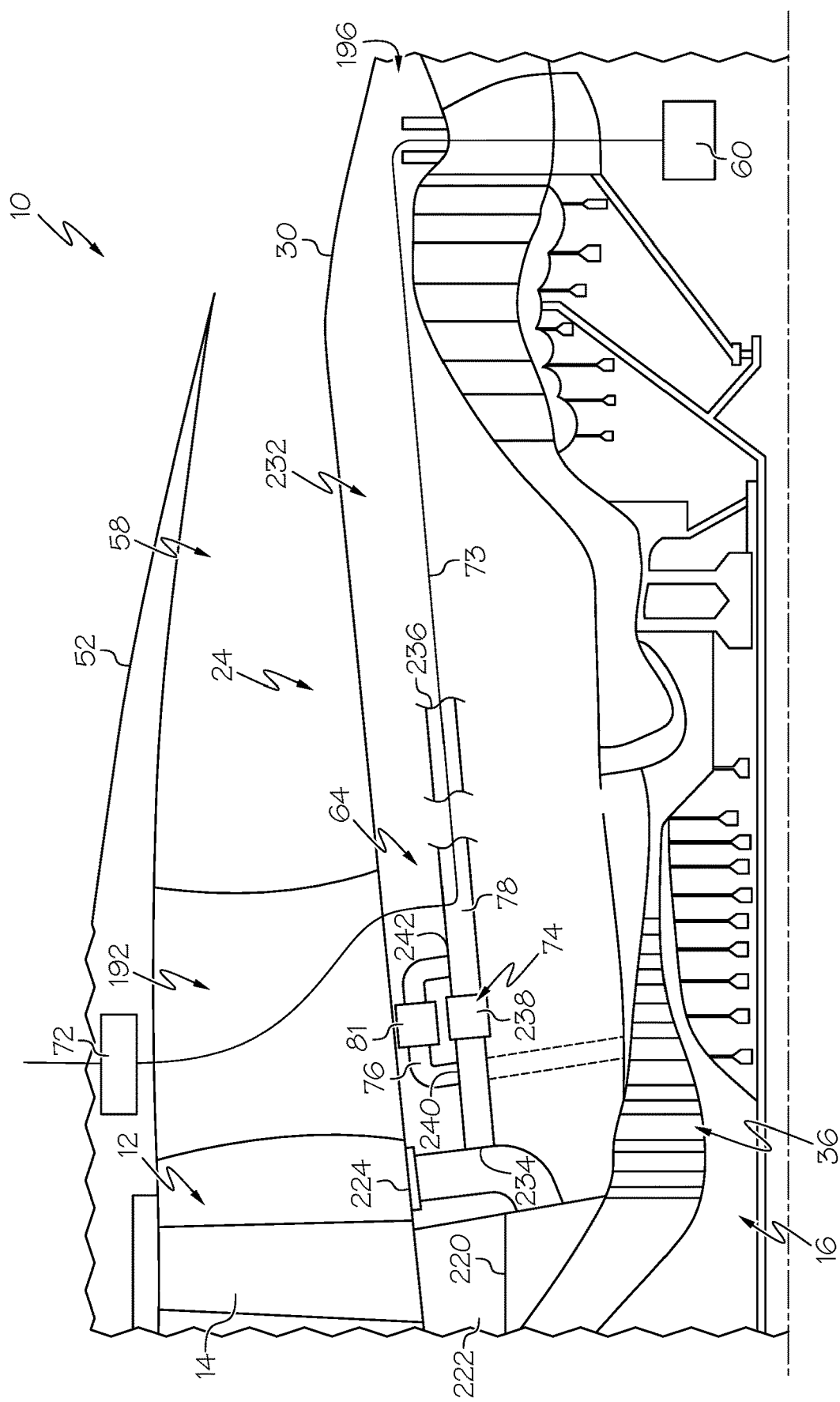
FIG. 5B is a diagrammatic section view of another embodiment of the gas turbine engine of FIG. 1, according to one or more embodiments shown and described herein.

When the gas turbine engine 10 is running, the valve assembly 74 is in the open configuration and the blower assembly 81 is inactive. The bypass duct 76 is pressurized with cooling air travelling from the bypass duct 226 and/or the bypass airflow passage 58. The cooling air travels through the valve assembly 74, into the circumferential duct 80 and then through the generator cooling ducts 82 (FIG. 2). FIG. 5A illustrates an embodiment with the converter 72 located in the bypass airflow passage 58. FIG. 5B illustrates another embodiment with the converter 72 located in the nacelle 52.

Figure 6A:
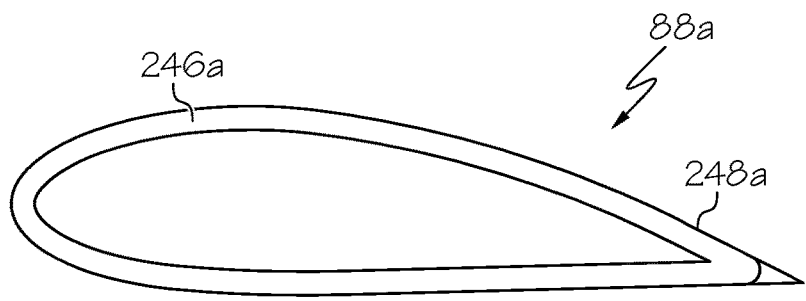
FIG. 6A is a diagrammatic section view of a strut of a turbine rear frame for use in the gas turbine engine of FIG. 1, according to one or more embodiments shown and described herein.
Figure 6B:
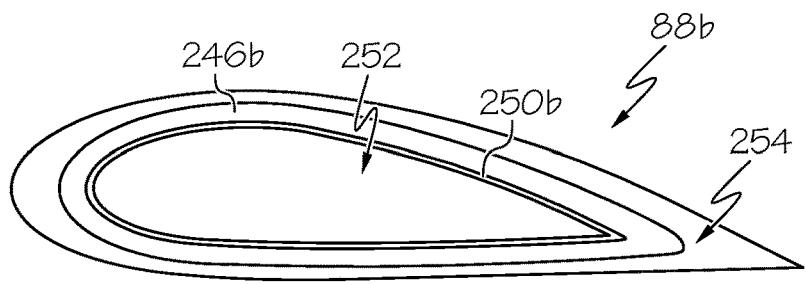
FIG. 6B is a diagrammatic section view of another strut of a turbine rear frame for use in the gas turbine engine of FIG. 1, according to one or more embodiments shown and described herein.
Figure 6C:
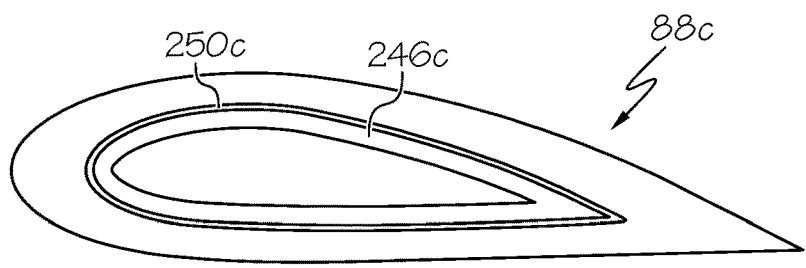
FIG. 6C is a diagrammatic section view of another strut of a turbine rear frame for use in the gas turbine engine of FIG. 1, according to one or more embodiments shown and described herein.
Figure 6D:
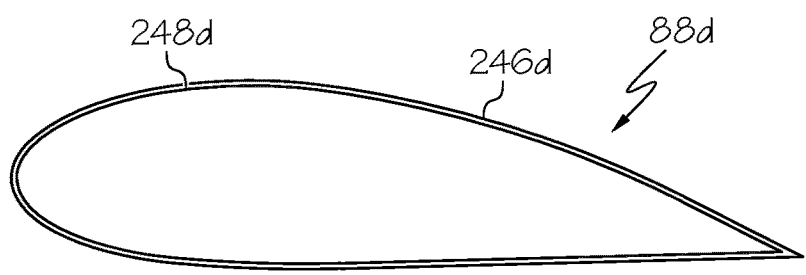
FIG. 6D is a diagrammatic section view of another strut of a turbine rear frame for use in the gas turbine engine of FIG. 1, according to one or more embodiments shown and described herein.

FIG. 3 illustrates the cooling airflow 166 flowing through the one of the struts 88 and alongside the electrical lines 170. In some embodiments, a thermal insulation layer may be provided along the strut 88. FIGS. 6A-6D diagrammatically illustrate different strut 88 embodiments that include a thermal insulation layer 246 that can further insulate the cooling airflow 166 flowing through the strut from the surrounding exhaust air from the engine turbine. FIG. 6A illustrates a thermal insulation layer 246a that is located on an internal surface of outer wall 248a and in direct contact with the cooling airflow. FIG. 6B illustrates a thermal insulation layer 246b that is located on an external surface of an internal passageway wall 250b that defines a passageway 252 within an opening 254 through the strut 88b. FIG. 6C illustrates a thermal insulation layer 246c that is located on an internal surface of internal passageway wall 250c. FIG. 6D illustrates a thermal insulation layer 246d that is located on an outer surface of outer wall 248d. FIGS. 6A-6D illustrate various thermal insulation layer placement examples and others are contemplated including any combinations of the arrangements of FIGS. 6A-6D. Further, any suitable materials may be used to form the thermal insulation layers, such as titanium alloys, iron-nickel alloys, advanced low CTE superalloys, ceramics, etc., either as thermal blankets and/or applied as coatings.

Referring again to FIG. 3, the cooling airflow 166 can remove heat from the electrical lines 170 and then flows into the first duct structure 184 of the duct assembly 180. The first duct structure 184 includes the outlet 196 that provides the cooling airflow 166 to the inner cooling manifold 140. The first duct structure 184 includes another outlet 255 that is connected to the duct support bracket 186 such that the cooling airflow 166 is supplied to the second duct structure 188. As can be seen, the first duct structure divides the cooling airflow 166 into multiple cooling airflows 166a and 166b. The cooling airflow 166a is directed past the outer generator stator 124, through one or more openings 256 in the support structure 144 and is then split into the multiple cooling airflows 156 and 168 by the inner cooling manifold 140. As described above, the cooling airflow 156 is directed along the airflow passageway 154 between the cooling plate 152 and the inner generator rotor 104 thereby removing heat from the inner generator rotor 104. The cooling air may then be directed to impinge upon the end windings 158 of the outer generator stator 124. The cooling airflow 168 flows through the inner cooling manifold 140 along a different path and impinges directly on the end windings 158 without flow by the inner generator rotor 104. The percentage of airflow 166a forming the cooling airflows 156 and 168 can be controlled using the seal 206 and/or the number and diameters of the openings 162, 164, e.g., when there is no seal 206. Once in the inner cooling manifold 140, the cooling air may also travel through a gap 250 between the inner generator rotor 104 and the outer generator stator 124, and remove heat from the electrical machine 60, in particular from components of the generator rotor subassembly 100, such as the magnets.

The cooling airflow 166b is directed from the first duct structure 184 to the second duct structure 188 and over the electrical connector 212. The cooling airflow 166b, in the illustrated embodiment, is not split into multiple airflows like the cooling airflow 166a, but, instead, is directed out of the outlet 198 and into the outer cooling manifold 142. The cooling airflow 166b then exits the outer cooling manifold 142 through opening 169 and impinges on the end windings 174.

The used cooling airflows 156, 168 and 166b may then meet and be directed out of the enclosure 178 along different paths. As used herein, the term "used cooling airflow" refers to cooling air that has removed heat from the electrical machine 60. The used cooling airflow, even having removed heat from the electrical machine 60, may still be of a sufficiently low temperature to provide a thermal buffer between the electrical machine 60 and the exhaust gas flowing outside the tail cone 65.

Some used cooling airflow 257 may flow directly out of an opening 256 in the thermal shield 176 and out of the tail cone 65. Another used cooling airflow 258 may be directed by the thermal shield 176 forward partially around the electrical machine forming an airflow buffer cavity 260. The used cooling airflow 258 may then be directed back through the strut 88 as shown by used cooling airflow 262 and/or out a rear of the tail cone 65 as shown by the used cooling airflow 264 that forms another airflow buffer cavity 266 spaced radially from the airflow buffer cavity 260.

Figure 7:
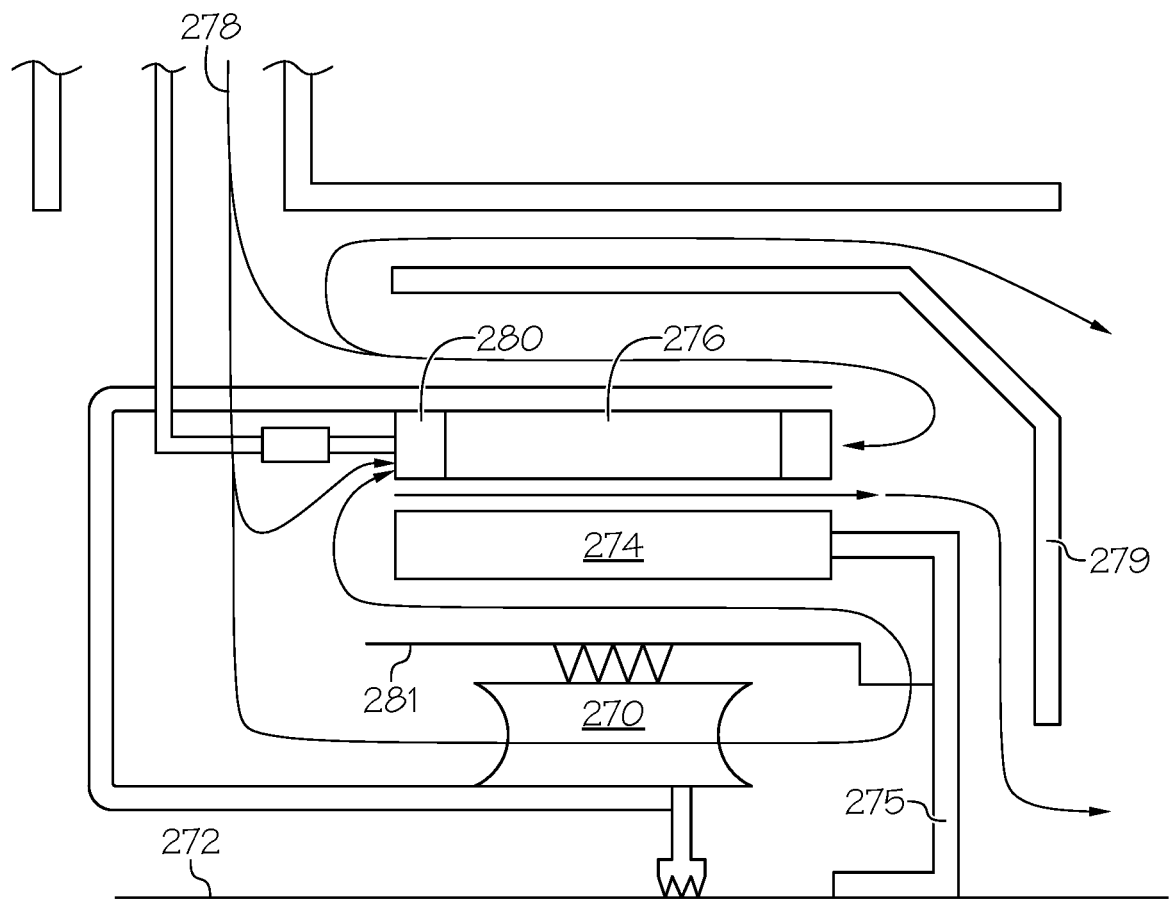
FIG. 7 is a diagrammatic section view of another aft portion and electrical machine of a gas turbine engine, according to one or more embodiments shown and described herein.

Various manifolds, ducts and other airflow devices may be used for directing flow over and through the inner generator rotor 104. For example, FIG. 7 illustrates another simplified example using an accelerator 270 that alters airflow direction. FIG. 7 includes many of the components discussed above including generator rotor 274, generator stator 276, thermal shield 278, etc. The manifold and duct assembly are largely omitted for simplicity, but the cooling airflow 278 arrangement is shown where the cooling airflow 279 is directed to the generator rotor 274 and also impinges on the end windings 280 of the generator stator 276. The accelerator 270 is a structure like an impeller or fin that causes the cooling airflow to move more circumferentially. The accelerator 270 may be stationary or the accelerator 270 may rotate, for example, with shaft 272. In some embodiments, the accelerator 270 may be mounted to rotor support member 275 and inner generator rotor 274 and rotate therewith. In the illustrated embodiment, an inner cooling plate 281 is mounted to the rotor support member 275 and rotates therewith thereby generating increased circumferential flow of the cooling airflow.

Figure 8:
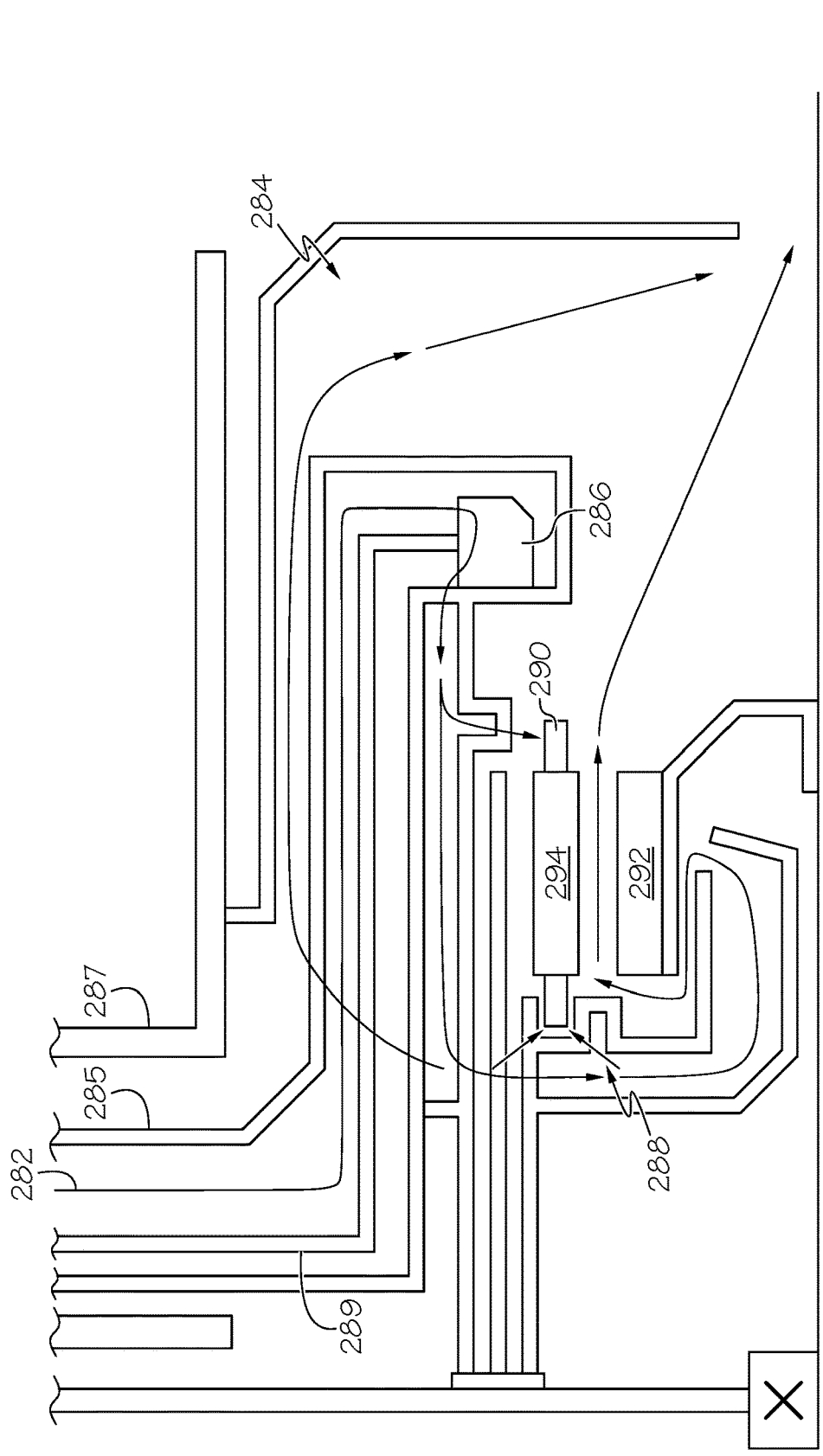
FIG. 8 is a diagrammatic section view of another aft portion and electrical machine of a gas turbine engine, according to one or more embodiments shown and described herein.

The flow paths of the new and used cooling airflows may be selected depending on engine architecture and desired cooling characteristics. For example, FIG. 8 illustrates an embodiment where a majority of the cooling airflow 282 incoming to enclosure 284 through air passageway 285 and strut 287 is directed along electrical lines 289 onto electrical connector 286 located rear of electrical machine 288, then routed to end windings 290 of generator stator 294 and to generator rotor 292. In this embodiment, cooling airflow 282 is directed from the electrical connector 286 and splits between the forward and aft sides of the electrical machine 288. In some embodiments, an accelerator may be added radially inward of the generator rotor 292 or elsewhere to introduce more of a circumferential flow vector to the cooling airflow flowing to the generator rotor 292.

The above-described jet turbine engines include cooling systems that help remove heat form the electrical machines (e.g., generator assemblies) and create multiple thermal barriers to reduce external heat load on the electrical machines. The cooling systems may include duct assemblies that direct the cooling airflow to desired locations, such as toward the generator rotor and the end windings of the generator stator. The duct assemblies and cooling manifolds can be used to preselected flow patterns in order to provide newer and used cooling air to desired locations. Further, the generator rotor may be provided with airflow passageways, cooling plates, etc. that facilitate cooling air reaching internal components of the generator rotor. Such cooling passages can amplify the internal cooling effects of the cooling airflow passing by and through the generator rotor.

As used herein, the singular forms "a," "an" and "the" include plural referents unless the context clearly dictates otherwise. Thus, for example, reference to "a" component includes aspects having two or more such components, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" may include any values within ten percent of a particular value, such as within five percent of a particular value, such as within two percent of a particular value, such as within one percent of a particular value.

Directional terms as used herein—for example up, down, right, left, front, back, top, bottom, upper, lower, —are made only with reference to the figures as drawn and are not intended to imply absolute orientation unless otherwise expressly stated. The terms "axial" and "longitudinal" both refer to a direction that is parallel to a centerline the gas turbine engine, while "radial" refers to a direction perpendicular to the longitudinal direction. The terms "tangential" and "circumferential" refer to a direction mutually perpendicular to both the radial and longitudinal directions. The terms "forward" or "front" refer to a location upstream in airflow passing through or around a component during operation, and the terms "aft" or "rear" refer to a location downstream during operation. These directional terms are used merely for convenience in the description and also do not require a particular orientation of the structures described thereby.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Further aspects are provided by the subject matter in the following clauses:

Clause 1: A method of removing heat from an electrical machine located in a gas turbine engine at least partially inward of a core airflow path in a radial direction, the electrical machine comprising an outer generator stator and an inner generator rotor, the method comprising: directing cooling airflow radially through an airflow passageway to an enclosure at least partially defined by a thermal shield at least partially around the electrical machine; and directing the cooling airflow radially inward past the outer generator stator and toward the inner generator rotor using a cooling manifold thereby removing heat from the generator rotor.

Clause 2: The method of any of the above clauses further comprising directing the cooling airflow radially through a radially extending channel of the inner generator rotor.

Clause 3. The method of any of the above clauses, wherein the inner generator rotor comprises multiple radially extending channels that direct the cooling airflow radially outward toward a gap between the inner generator rotor and the outer generator stator.

Clause 4. The method of any of the above clauses, wherein the cooling manifold is mounted to a stationary support structure, the cooling manifold comprising an axially extending cooling plate located radially inward of the inner generator rotor thereby defining another airflow passageway, the method comprising directing the cooling airflow axially through the another airflow passageway.

Clause 5: The method of any of the above clauses further comprising restricting a flow rate of the cooling airflow through the another airflow passageway using a seal.

Clause 6: The method of any of the above clauses restricting a flow rate of the cooling airflow through the another airflow passageway using one or more openings through the cooling manifold having a diameter sized to restrict the cooling airflow.

Clause 7: The method of any of the above clauses, wherein the inner generator rotor comprises a rotor disk comprising multiple surface mounted permanent magnets and an axially extending cooling duct that receives the cooling airflow.

Clause 8: The method of any of the above clauses, wherein the cooling duct extends axially between adjacent permanent magnets.

Clause 9: The method of any of the above clauses, wherein the inner generator rotor comprises a rotor disk comprising a radially extending channel, the method comprising directing the cooling airflow to a gap between the inner generator rotor and outer generator stator.

Clause 10: The method of any of the above clauses, wherein the cooling manifold comprises a radial portion that extends alongside the generator rotor, the radial portion directing the cooling airflow toward end windings of the outer generator stator and used cooling air into a gap between the inner generator rotor and outer generator stator.

Clause 11: The method of any of the above clauses further comprising an accelerator located radially inward from the inner generator rotor and coupled to the rotary member, the accelerator moving the cooling airflow in a circumferential direction as the cooling airflow approaches the inner generator rotor.

Clause 12: The method of claim 1 further comprising an axially extending cooling plate located radially inward of the inner generator rotor thereby defining another airflow passageway rotating with the inner generator rotor, the method comprising directing the cooling airflow axially through the another airflow passageway.

Clause 13: A gas turbine engine comprising: a compressor section and a turbine section arranged in serial flow order, the compressor section and the turbine section together defining a core airflow path; a rotary member rotatable with at least a portion of the compressor section and with at least a portion of the turbine section; an electrical machine located at least partially inward of the core airflow path in a radial direction, the electrical machine comprising an outer generator stator and an inner generator rotor that is coupled to the rotary member; a thermal shield forming an enclosure at least partially around the electrical machine, the thermal shield at least partially defining a cooling airflow path at least partially around the electrical machine; and a cooling manifold that directs a cooling airflow received from an airflow passageway past the outer generator stator and onto the inner generator rotor.

Clause 14: The gas turbine engine of claim 12 further comprising a cooling plate inwardly adjacent the inner generator rotor, the cooling plate having a radially extending channel that directs the cooling airflow radially outward toward the inner generator rotor.

Clause 15: The gas turbine engine of any of the above clauses, wherein the cooling plate comprises multiple radially extending channels that direct the cooling airflow radially outward toward the inner generator rotor.

Clause 16: The gas turbine engine of any of the above clauses, wherein the cooling manifold is mounted to a stationary support structure, the cooling manifold comprising an axially extending portion located radially inward of the cooling plate thereby defining another airflow passageway that directs the cooling airflow axially between the cooling plate and the axially extending portion of the cooling manifold.

Clause 17: The gas turbine engine of any of the above clauses, wherein the cooling manifold is mounted to a stationary support structure, the cooling manifold comprising an axially extending portion located radially inward of the inner generator rotor thereby defining another airflow passageway that directs the cooling airflow axially between the inner generator rotor and the axially extending portion of the cooling manifold.

Clause 18: The gas turbine engine of any of the above clauses further comprising a seal in the another airflow passageway that restricts a flow rate of the cooling airflow thereby.

Clause 19: The gas turbine engine of any of the above clauses, wherein the inner generator rotor comprises a rotor disk comprising multiple surface mounted permanent magnets and an axially extending cooling duct that receives the cooling airflow.

Clause 20: The gas turbine engine of any of the above clauses, wherein the cooling duct extends axially between adjacent permanent magnets.

Clause 21: The gas turbine engine of any of the above clauses, wherein the inner generator rotor comprises a rotor disk comprising a radially extending channel that directs the cooling air to a gap between the inner generator rotor and outer generator stator.

Clause 22: The gas turbine engine of any of the above clauses, wherein the cooling manifold comprises a radial portion that extends alongside the inner generator rotor and directs the cooling airflow toward end windings of the outer generator stator and used cooling air into a gap between the inner generator rotor and outer generator stator.

Clause 23: The gas turbine engine of any of the above clauses further comprising an accelerator located radially inward from the inner generator rotor and coupled to the rotary member, the accelerator configured to move the cooling air in a circumferential direction as the cooling airflow approaches the inner generator rotor.

Clause 24: The gas turbine engine of any of the above clauses, wherein the strut comprises a thermal insulation layer about and along the airflow passageway extending radially through the strut.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of removing heat from an electrical machine located in a gas turbine engine at least partially inward of a core airflow path in a radial direction, the electrical machine comprising an outer generator stator and an inner generator rotor, the method comprising:
   directing cooling airflow radially inward through an airflow passageway that extends radially through a strut of a turbine rear frame to an enclosure at least partially defined by a thermal shield at least partially around the electrical machine; and
   directing the cooling airflow radially inward past the outer generator stator and toward the inner generator rotor disposed radially inward from the outer generator stator using a cooling manifold thereby removing heat from the generator rotor.

2. The method of claim 1 further comprising directing the cooling airflow radially through a radially extending channel of the inner generator rotor.

3. The method of claim 2, wherein the inner generator rotor comprises multiple radially extending channels that direct the cooling airflow radially outward toward a gap between the inner generator rotor and the outer generator stator.

4. The method of claim 1, wherein the cooling manifold is mounted to a stationary support structure, the cooling manifold comprising an axially extending cooling plate located radially inward of the inner generator rotor thereby defining another airflow passageway, the method comprising directing the cooling airflow axially through the another airflow passageway.

5. The method of claim 4 further comprising restricting a flow rate of the cooling airflow through the another airflow passageway using a seal.

6. The method of claim 1 restricting a flow rate of the cooling airflow through the another airflow passageway using one or more openings through the cooling manifold having a diameter sized to restrict the cooling airflow.

7. The method of claim 1, wherein the inner generator rotor comprises a rotor disk comprising multiple surface mounted permanent magnets and an axially extending cooling duct that receives the cooling airflow.

8. The method of claim 7, wherein the cooling duct extends axially between adjacent permanent magnets.

9. The method of claim 1, wherein the inner generator rotor comprises a rotor disk comprising a radially extending channel, the method comprising directing the cooling airflow to a gap between the inner generator rotor and outer generator stator.

10. The method of claim 1, wherein the cooling manifold comprises a radial portion that extends alongside the generator rotor, the radial portion directing the cooling airflow toward end windings of the outer generator stator and used cooling air into a gap between the inner generator rotor and outer generator stator.

11. The method of claim 1 further comprising an accelerator located radially inward from the inner generator rotor and coupled to the rotary member, the accelerator moving the cooling airflow in a circumferential direction as the cooling airflow approaches the inner generator rotor.

12. The method of claim 1 further comprising an axially extending cooling plate located radially inward of the inner generator rotor thereby defining another airflow passageway rotating with the inner generator rotor, the method comprising directing the cooling airflow axially through the another airflow passageway.

13. A gas turbine engine comprising:
  a compressor section and a turbine section arranged in serial flow order, the compressor section and the turbine section together defining a core airflow path;
  a rotary member rotatable with at least a portion of the compressor section and with at least a portion of the turbine section;
  an electrical machine located at least partially inward of the core airflow path in a radial direction, the electrical machine comprising an outer generator stator and an inner generator rotor that is coupled to the rotary member;
  a thermal shield forming an enclosure at least partially around the electrical machine, the thermal shield at least partially defining a cooling airflow path at least partially around the electrical machine; and
  a cooling manifold that directs a cooling airflow received from an airflow passageway that extends radially through a strut of a turbine rear frame past the outer generator stator and onto the inner generator rotor disposed radially inward from the outer generator stator.

14. The gas turbine engine of claim 13 further comprising a cooling plate inwardly adjacent the inner generator rotor, the cooling plate having a radially extending channel that directs the cooling airflow radially outward toward the inner generator rotor.

15. The gas turbine engine of claim 14, wherein the cooling plate comprises multiple radially extending channels that direct the cooling airflow radially outward toward the inner generator rotor.

16. The gas turbine engine of claim 15, wherein the cooling manifold is mounted to a stationary support structure, the cooling manifold comprising an axially extending portion located radially inward of the cooling plate thereby defining another airflow passageway that directs the cooling airflow axially between the cooling plate and the axially extending portion of the cooling manifold.

17. The gas turbine engine of claim 13, wherein the cooling manifold is mounted to a stationary support structure, the cooling manifold comprising an axially extending portion located radially inward of the inner generator rotor thereby defining another airflow passageway that directs the cooling airflow axially between the inner generator rotor and the axially extending portion of the cooling manifold.

18. The gas turbine engine of claim 13 further comprising a seal in the another airflow passageway that restricts a flow rate of the cooling airflow thereby.

19. The gas turbine engine of claim 13, wherein the inner generator rotor comprises a rotor disk comprising multiple surface mounted permanent magnets and an axially extending cooling duct that receives the cooling airflow.

20. The gas turbine engine of claim 19, wherein the cooling duct extends axially between adjacent permanent magnets.

21. The gas turbine engine of claim 13, wherein the inner generator rotor comprises a rotor disk comprising a radially extending channel that directs the cooling air to a gap between the inner generator rotor and outer generator stator.

22. The gas turbine engine of claim 13, wherein the cooling manifold comprises a radial portion that extends alongside the inner generator rotor and directs the cooling airflow toward end windings of the outer generator stator and used cooling air into a gap between the inner generator rotor and outer generator stator.

23. The gas turbine engine of claim 13 further comprising an accelerator located radially inward from the inner generator rotor and coupled to the rotary member, the accelerator configured to move the cooling air in a circumferential direction as the cooling airflow approaches the inner generator rotor.

24. The gas turbine engine of claim 13, wherein the strut comprises a thermal insulation layer about and along the airflow passageway extending radially through the strut.

* * * * *